United States Patent
Zhou

(10) Patent No.: US 8,389,349 B2
(45) Date of Patent: Mar. 5, 2013

(54) METHOD OF MANUFACTURING A CAPACITIVE TRANSDUCER

(76) Inventor: Tiansheng Zhou, Edmonton (CA)

( * ) Notice: Subject to any disclaimer, the term of this patent is extended or adjusted under 35 U.S.C. 154(b) by 0 days.

(21) Appl. No.: 13/453,957

(22) Filed: Apr. 23, 2012

(65) Prior Publication Data

US 2012/0260500 A1    Oct. 18, 2012

Related U.S. Application Data

(62) Division of application No. 11/946,204, filed on Nov. 28, 2007, now Pat. No. 8,165,323.

(51) Int. Cl.
*H04R 25/00*    (2006.01)
(52) U.S. Cl. ............... 438/174; 381/176; 438/53
(58) Field of Classification Search ............ 381/174, 381/176; 438/52, 53, 619, 666
See application file for complete search history.

(56) References Cited

U.S. PATENT DOCUMENTS

| | | | |
|---|---|---|---|
| 5,146,435 A | 9/1992 | Bernstein | |
| 5,408,731 A | 4/1995 | Berggvist et al. | |
| 5,452,268 A | 9/1995 | Bernstein | |
| 5,490,220 A | 2/1996 | Loeppert | |
| 5,662,771 A * | 9/1997 | Stouppe | 438/52 |
| 5,870,482 A | 2/1999 | Loeppert et al. | |
| 6,012,335 A | 1/2000 | Bashir et al. | |
| 6,522,762 B1 | 2/2003 | Mullenborn et al. | |
| 6,535,460 B2 | 3/2003 | Loeppert et al. | |
| 6,552,469 B1 | 4/2003 | Pederson et al. | |
| 6,628,041 B2 * | 9/2003 | Lee et al. | 310/309 |
| 6,654,473 B2 | 11/2003 | Collins | |
| 6,763,116 B2 | 7/2004 | Barthel et al. | |
| 6,771,001 B2 * | 8/2004 | Mao et al. | 310/309 |
| 6,781,231 B2 | 8/2004 | Minervini | |
| 6,794,217 B2 | 9/2004 | Lee et al. | |
| 6,829,131 B1 | 12/2004 | Loeb et al. | |
| 6,829,814 B1 | 12/2004 | Freeman et al. | |
| 6,847,090 B2 | 1/2005 | Loeppert | |
| 6,859,542 B2 | 2/2005 | Johannsen et al. | |
| 6,936,524 B2 | 8/2005 | Zhu et al. | |
| 7,023,066 B2 | 4/2006 | Lee et al. | |
| 7,051,590 B1 | 5/2006 | Lemkin et al. | |
| 7,114,397 B2 | 10/2006 | Fortin et al. | |
| 7,134,179 B2 | 11/2006 | Freeman et al. | |
| 7,296,476 B2 | 11/2007 | Fortin et al. | |
| 7,305,889 B2 | 12/2007 | Fortin et al. | |
| 7,545,945 B2 | 6/2009 | Miles | |
| 2002/0106828 A1 | 8/2002 | Loeppert | |
| 2004/0209435 A1 * | 10/2004 | Partridge et al. | 438/381 |
| 2005/0061770 A1 | 3/2005 | Neumann, Jr., et al. | |
| 2005/0101047 A1 | 5/2005 | Freeman et al. | |
| 2005/0132805 A1 * | 6/2005 | Park et al. | 73/514.32 |

(Continued)

FOREIGN PATENT DOCUMENTS

| FR | 1 292 171 A2 | 12/2003 |
|---|---|---|
| WO | 2004/105428 A1 | 12/2004 |

*Primary Examiner* — Phuc Dang
(74) *Attorney, Agent, or Firm* — Davis & Bujold, PLLC

(57) ABSTRACT

A method of manufacturing a capacitive transducer by applying a first etching mask on a layer. Applying a second etching mask to define the movable set of fingers, the fixed set of fingers, a body, and springs, and the body is connected to the movable set of fingers and the springs while the movable set of fingers are interdigitated with the fixed set of fingers. Etching the layer and the first etching mask using the second etching mask and removing the second etching mask. Etching the layer such that one of the movable set of fingers and the fixed set of fingers is shorter than the other of the movable set of fingers and the fixed set of fingers. Releasing the body, the springs, and the movable set of fingers using etching, such that, upon applying a force to the body, the body moves parallel to the substrate.

8 Claims, 20 Drawing Sheets

U.S. PATENT DOCUMENTS

2006/0000931 A1 1/2006 Ricco et al.
2006/0008089 A1 1/2006 Willems
2006/0093170 A1 5/2006 Zhe et al.
2006/0093171 A1 5/2006 Zhe et al.

* cited by examiner

METHOD OF MANUFACTURING A CAPACITIVE TRANSDUCER

CROSS REFERENCE TO RELATED PATENT APPLICATIONS

The present application is a divisional application of U.S. application Ser. No. 11/946,204 filed Nov. 28, 2007 now U.S. Pat. No. 8,165,323.

FIELD

The present patent document relates to a monolithic capacitive transducer, such as a miniature capacitive transducer.

BACKGROUND

Miniature micromachined microphones have gained great popularity in a variety of applications. Because of its sub-mm size, low cost for mass production, lower power consumption, higher sensitivity and reliability, it is widely recognized as the next generation product to replace the conventional electrets condenser microphone (ECM) in applications such as hearing aids, cell phones, PDAs, laptops, MP3, digital cameras etc. Among all the micromachined microphones, the capacitive condenser type of microphone has many advantages over other technical approaches such as piezoelectric or magnetic type micromachined microphone for its smaller size and higher sensitivity etc.

The micromachined condenser microphone typically consists of an acoustic pressure sensing element, generally a variable capacitor, and a preamplifier IC circuit. One prior art example of a condenser microphones with a parallel plate capacitor is disclosed in U.S. patent publication no. 2006/0093170 (Zhe et al.) entitled "Backplateless silicon microphone". The prior art suffers from some or all of shortcomings mentioned below due to the structure and sensing motion of the parallel plate variable capacitor.

First of all, residual film stress on the diaphragm reduces the sensitivity of the microphone. Since the compliant diaphragm is usually made of a thin film of dielectric and electrically conductive materials, it is very difficult to control or reduce its residual stress because the residual stress is present after the film formation. Stress on the diaphragm has a direct impact on the sensitivity of the microphone. Compressive residual stress results in a defective, buckled diaphragm. Tensile stress severely decreases the sensitivity of the microphone, or totally ruptures the diaphragm at the worst cases.

Secondly, stiction between a flexible diaphragm and a rigid backplate can result in either a faulty device during microfabrication or malfunction during operation. When the gap between the compliant diaphragm and the backplate is on the order of several microns, the diaphragm will adhere to the fixed backplate with a larger probability because the surface to volume ratio increases and surface forces, which are responsible for stiction, are correspondingly higher. Stiction could prevent the successful releasing of the suspended compliant diaphragm during the wet process of the sacrificial layer etching, leading to permanent adhesion to the fixed backplate. During the operation, if the microphone is exposed to a humid environment, water vapor can condense and form a water film on the diaphragm and backplate surfaces. When the gap between the two surfaces decreases during operation and the water film of one surface touches the counter surface, the two surfaces will stick together.

Thirdly, "squeeze film" air damping affects the high frequency response, and contributes noise to the microphone output by generating pressure fluctuations in the microphone structure. For the sub-mm-sized capacitive condenser microphone, the air gap must be scaled down to several microns to keep the capacitance value in a range which can drive the input of the buffer amplifier effectively. However, as the air gap is reduced, the "squeeze film" damping effects due to the viscous flow of air trapped between the diaphragm and backplate increases rapidly. "Squeeze film" air damping can also impact the sensitivity of the microphone.

Fourthly, the "pull-in" effect of the diaphragm reduces the DC bias voltage, which therefore lowers the sensitivity of the microphone. A higher DC bias voltage between diaphragm and backplate yields higher sensitivity. A higher DC bias voltage will create a larger attractive electrostatic force between the diaphragm and backplate. However, in some prior art examples, the gap between the diaphragm and backplate is reduced to several microns, and the mechanical compliance of the diaphragm is kept fairly low in order to have some deflection under certain sound pressure level. Larger attractive electrostatic force can overcome the mechanical restoring force of the diaphragm, and can pull the compliant diaphragm over the small gap to touch the backplate. This phenomenon is called the "pull-in" effect.

Fifthly, a sub-mm-sized diaphragm that is fully constrained by the surrounding frame reduces the sensitivity of the microphone. The compliance of the diaphragm tends to decease very rapidly with the decreasing size for a given diaphragm material and thickness. The mechanical compliance/stiffness of the diaphragm for the sound pressure scales as the fourth power of the diaphragm size.

Sixthly, the small air gap and compliant diaphragm of parallel plate type capacitive condenser microphones can't provide a large dynamic range as higher sound pressure levels could drive the flexible diaphragm to contact the backplate across the small air gap.

Seventhly, the parasitic capacitance between the flexible diaphragm and rigid fixed backplate degrades the microphone performance. The capacitance between the diaphragm and backplate has two parts. The first part varies with acoustical signal and is desirable for microphone. The second part is a parasitic capacitance which does not vary with acoustical signal. The parasitic capacitance degrades the performance and should be minimized. However, the parasitic capacitance is related to the construction of the parallel plate type of silicon microphone in the prior arts.

Last but not least, the parallel plate type capacitive condenser microphone is fairly complicated and costly for manufacturing. So far, the prior art has been unable to provide an economic manufacturing method for the mass production of microphones. Some manufacturing methods of sensing elements disclosed in the prior art are not compatible with standard IC CMOS process, resulting in larger hybrid package and higher manufacturing cost.

SUMMARY

A capacitive transducer includes a substrate having a first surface and a second surface. The first surface of the substrate defines a first plane. The substrate has a cavity with an interior peripheral edge. The cavity extends between the first surface and the second surface. A body is provided that has an exterior peripheral edge. The body is parallel to the first plane and at least partially blocking the cavity. The body is connected to the substrate by resilient hinges such that, upon the application of a force, the body moves perpendicular to the first plane. A first set of comb fingers is mounted to the substrate. The first set of comb fingers is connected to a first electrical connection. A second set of comb fingers is mounted to the body and extends past the exterior peripheral edge of the body. The second set of comb fingers is connected to a second electrical connection that is isolated from the first connection. The first set of comb fingers and the second set of comb finger are interdigitated such that as the body moves, the first set of comb fingers and the second set of comb finger maintain a relative spacing. The first set of comb fingers and the second set of comb fingers define a capacitance. The capacitance is related to the relative position of the first set of comb drive fingers and the second set of comb drive fingers.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 6b is an enlarged perspective view of a portion C of the comb fingers and hinge depicted in FIG. 6a;

FIG. 7b is an enlarged perspective view of a portion D of the comb fingers and hinge depicted in FIG. 7a;

FIG. 9b is an enlarged perspective view of a portion E of the comb finger and hinge depicted in FIG. 9a;

FIG. 10b is an enlarged perspective view of a portion F of the comb finger and hinge depicted in FIG. 10a;

DETAILED DESCRIPTION

The device described below is a miniature sub-mm-sized capacitive condenser with higher sensitivity, larger dynamic measurement range that overcomes the disadvantages of the parallel plate condenser silicon microphones disclosed in the prior art. The sensing element structure of the microphone reduces or eliminates residual stress effects, stiction, "squeeze film" air damping, and "pull-in". This kind of transducer may be used in microphones and microspeakers used for hearing aids, cell phones, PDAs, laptops, MP3 players, digital cameras and other applications. It may also be used as an accelerometer, pressure sensors, actuator for a pump, optical switches, and optical interferometers. The design and fabrication method described below can also be used for miniature low voltage electrostatic driven microspeakers, accelerometers, etc. In one embodiment, the manufacturing method for the sensing and actuation structure is compatible with standard IC COMS process to form a monolithic integrated miniature silicon capacitive transducer.

The vertical combdrive structure that allows sensing or actuation eliminates residual thin film stress on the diaphragm, "pull-in" effects and "squeeze film" air damping of the parallel plate type of capacitive sensing and actuation in the prior art examples. The working capacitance of the device is achieved by the interdigital vertical comb fingers. The vertical comb finger structure avoids the need of the backplate which attributes microfabrication challenges and performance sacrifices. The teachings herein provides design and microfabrication method for both sub-mm-sized silicon capacitive microphone with higher sensitivity, larger dynamic range, a miniature electrostatic driven microspeaker with low power consumption and low driving voltage, and also a miniature capacitive accelerometer etc.

The same structure design principle can be used either in the sensing mode which is applicable for a microphone or an accelerometer etc., or in the actuation mode which is applicable for a microspeaker etc.

Sensing Mode

Figure 1:
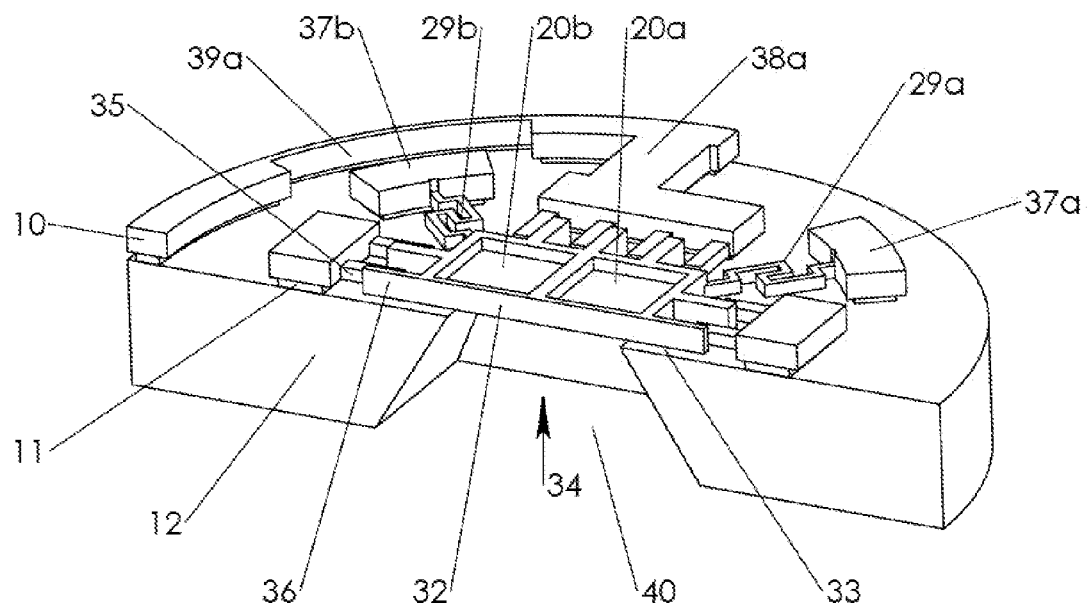
FIG. 1 is a cross sectional perspective view of the microphone according to a first embodiment.
Figure 11:
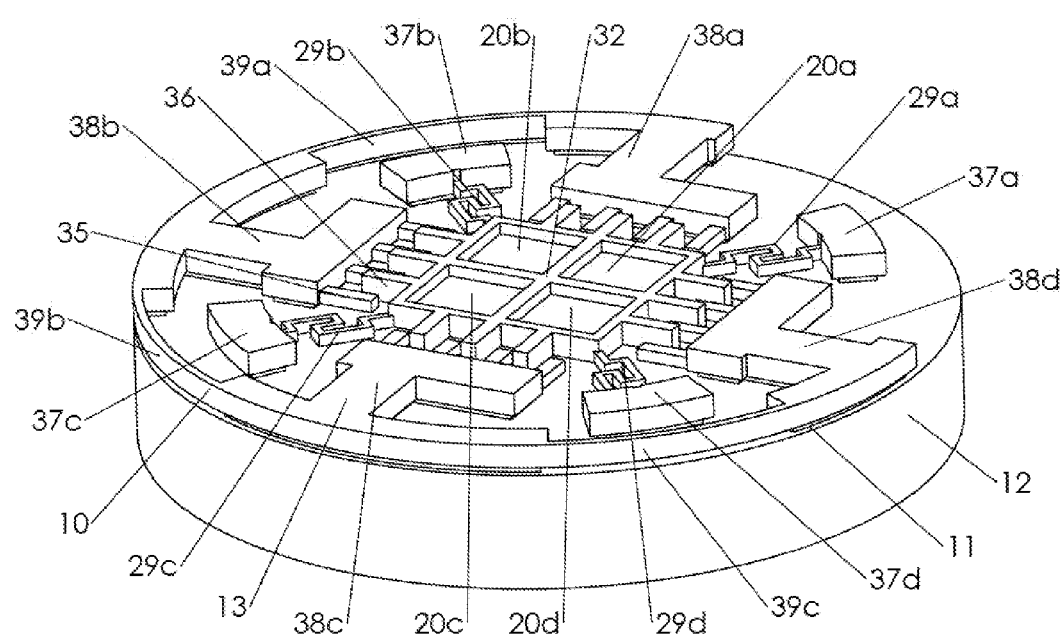
FIG. 11 is a perspective view of the transducer in FIG. 10 after removal of oxide on the front side and partial etching of buried oxide layer to release the diaphragm and movable fingers.
Figure 12:
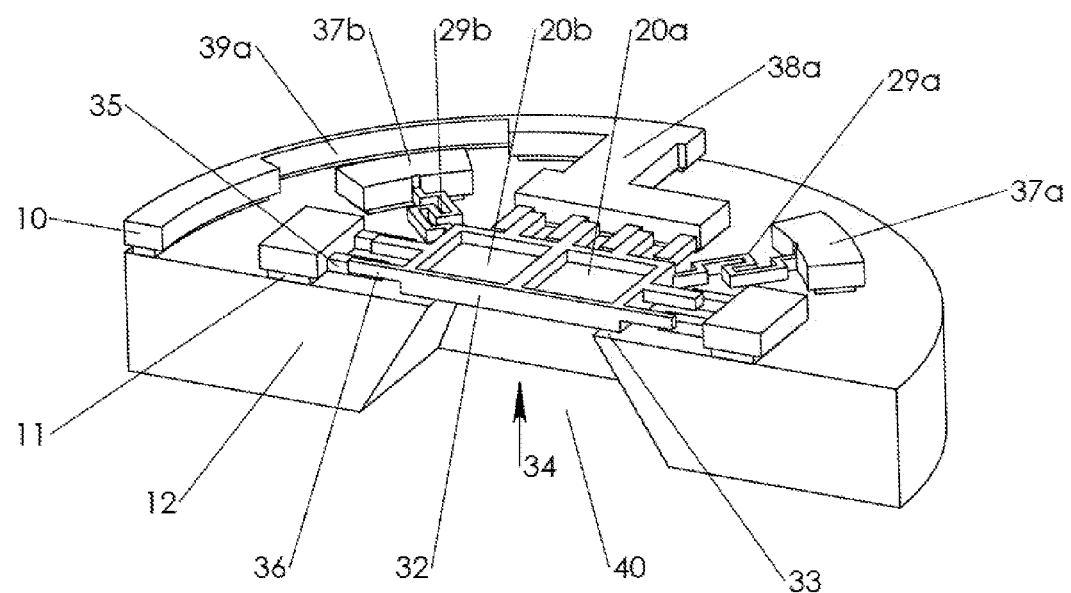
FIG. 12 is a cross sectional perspective view of the microphone according to a second embodiment.

FIGS. 1, 11 and 12 show a suitable example of a device structure design used for sensing, which is useful, for example, as a microphone or accelerometer. In this embodiment, the device has been formed using a SOI (Silicon On Insulator) substrate. The capacitive transducer is made from bulk conductive silicon mounted on a substrate, which is also referred to below as a carrier wafer 12. The diaphragm 32 is supported by four hinges 29a, 29b, 29c and 29d that are connected to the corners of the rectangular diaphragm 32. The diaphragm 32, which is the body that moves when a force is applied, is connected to the fixed anchors 37a, 37b, 37c and 37d mounted on the substrate, which is a by serpentine shaped silicon hinges 29a, 29b, 29c and 29d, respectively. The anchors 37a, 37b, 37c and 37d are sitting on a dielectrical material layer 11, such as an oxide. The sensing element is made up of a vertical combdrive structure that includes a first set of fixed comb fingers 35 and a second set of movable lower comb fingers 36. All the movable comb fingers 36 are formed on the outside edge of the diaphragm 32. It will be understood that comb fingers 35 and 36 need not be positioned on all sides of the diaphragm 32 as shown. For example, the fingers may be positioned on two parallel edges of the diaphragm 32. The fixed comb finger structures 35 are built around the diaphragm 32 and fixed on the dielectrical material 11 by anchors 38a, 38b, 38c and 38d. The diaphragm 32, hinges 29a, 29b, 29c and 29d, anchors 37a, 37b, 37c, 37d, 38a, 38b, 38c and 38d, vertical comb fingers 35 and 36 and electrical interconnection structures 39a, 39b and 39c are made of the same layer of electrical conductive material, such as a conductive single crystal silicon 10 which is on the top of a layer dielectrical material 11 that separates the silicon layer 10 from a base substrate 12 in a SOI structure. The electrical interconnection structures 39a, 39b and 39c electrically connect all four fixed comb finger structures 35 which are around the diaphragm 32, while movable comb finger structures 36 are electrically connected by diaphragm 32. As such, any anchor 37a, 37b, 37c, and 37d, can be used as an electrical connection point, and any anchor 38a, 38b, 38c and 38d can be used as the other electrical connection point for an integrated on-chip IC circuit, or for the wire bonding pads if a hybrid package is required for the transducer.

As can be seen in FIG. 1, the exterior peripheral edge of the diaphragm 32 overlaps the interior peripheral edge of the cavity 40. When used as a microphone, this overlap of the diaphragm 32 and the carrier wafer 12 is required to create a long air flow path 33 between the diagram 32 with movable fingers 36 and carrier wafer 12 to reduce leakage around the diaphragm 32. This establishes a reasonably high resistance, which improves the low frequency response of the transducer. Another method of reducing leakage is to coat the diaphragm 32 on the cavity side 40 with a light weight material, such as a polymer (not shown) to reduce the gap between the diagram 32 with movable fingers 36 and carrier wafer 12. This may be done, for example, by sputtering or other deposition techniques. During deposition, the material may also be deposited on the sides of the cavity. However, this is not undesirable, as it would also reduce the gap.

The capacitance increases with the number of comb fingers. For a sub-mm-size diaphragm, it is possible to form a sufficient number of movable comb fingers 36 to achieve working capacitance of Pico Farads, which is equivalent to the capacitance offered by parallel plate structure in the prior arts. When the diaphragm 32 is subjected to pressure waves such as acoustic pressure, or accelerations/decelerations, the diaphragm 32 will move up and down in a piston style movement. The serpentine design of the springs 29a, 29b, 29c, and 29d helps establish a substantially linear movement throughout. The movement of the diaphragm 32 can be detected by monitoring the capacitance changes between the movable fingers 36 and fixed comb fingers 35. In addition, the capacitance changes between the movable fingers 36 and the fixed carrier wafer 12 may also be measured, which for example increases the sensitivity of the sensor by taking a differential measurement of the changes in capacitance. In addition, since the vertical comb finger structure and flexible hinges are used, the capacitance change is more sensitive to acoustic pressure 34 or accelerations/decelerations due to the fringe effects of the small comb fingers, which also results in higher sensitivity of the transducer. The flexible hinges helps maintain the piston movement of the diaphragm 32 instead of the parabolic deformation of the diaphragm in the prior art.

The etching cavities 20a, 20b, 20c and 20d on the diaphragm 32 are to reduce the mass the diaphragm 32 for better high frequency response. The transducer requires no backplate, since its diaphragm 32 is suspended on the cavity 40 of the carrier wafer 12. A barometric relief is not needed for the microphone.

Actuation Mode

Figure 14:
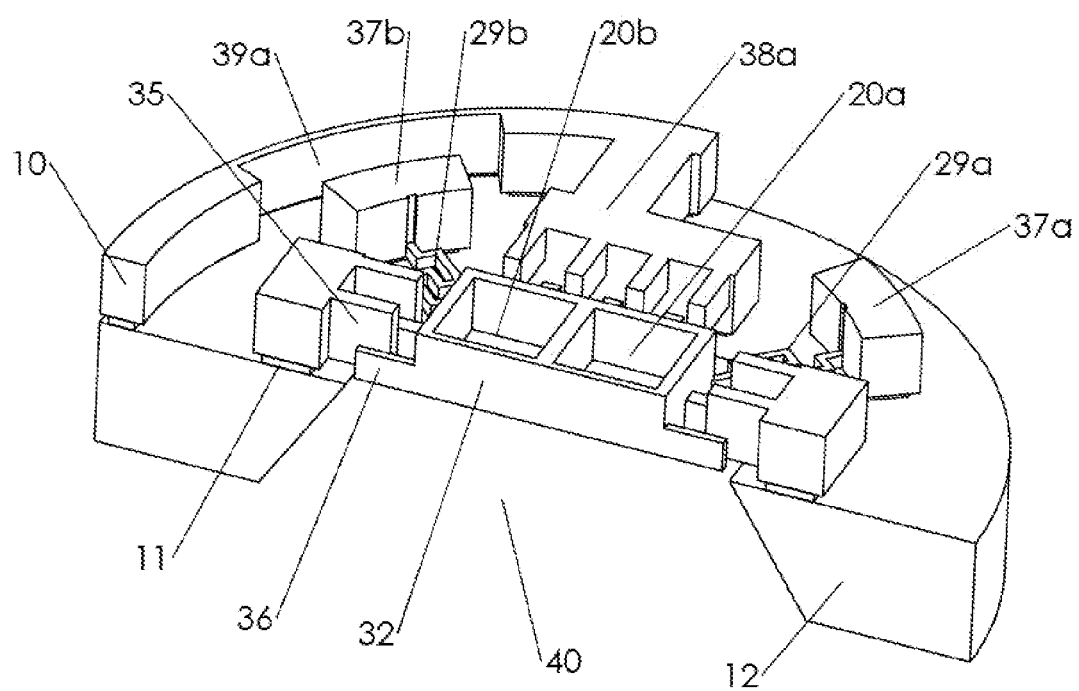
FIG. 14 is a cross sectional perspective view of the microspeaker with a larger back cavity and taller comb finger according to a third embodiment.
Figure 15:
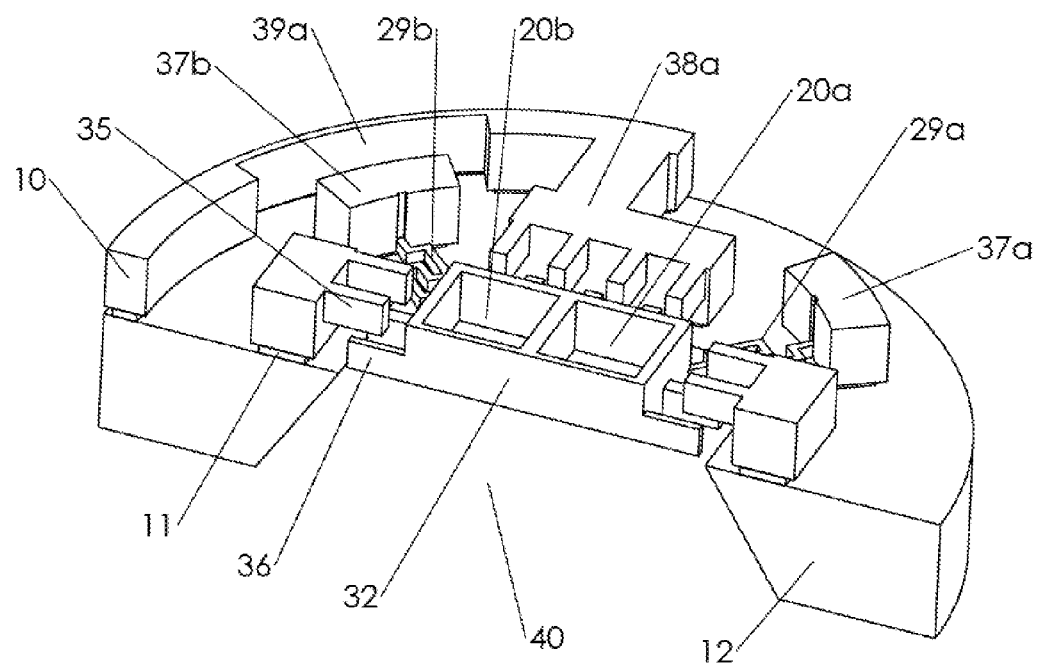
FIG. 15 is a cross sectional perspective view of the microspeaker with a larger back cavity and taller comb finger according to a fourth embodiment.
Figure 16:
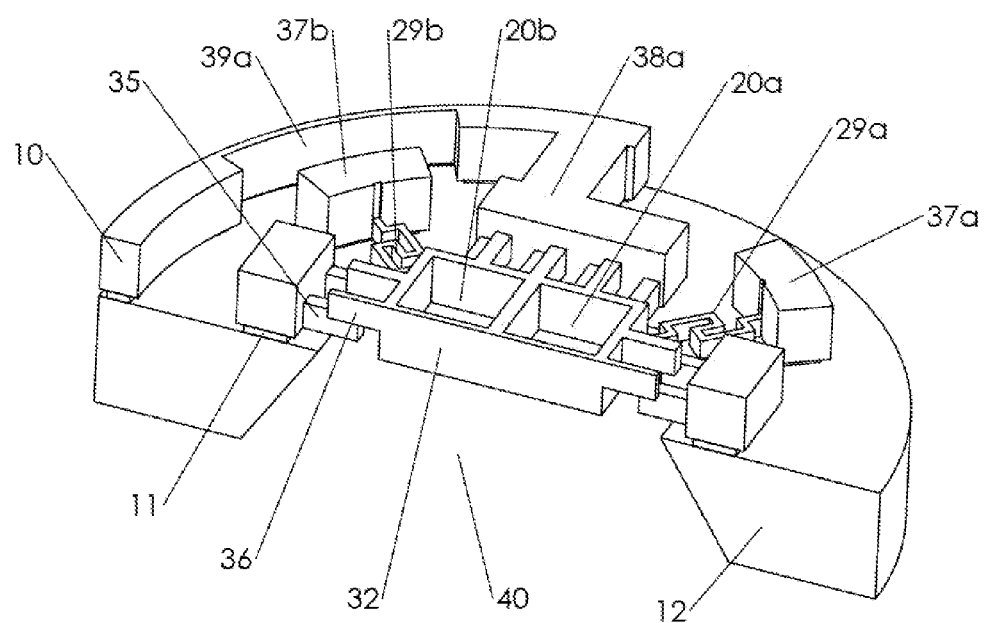
FIG. 16 is a cross sectional perspective view of the microspeaker with a larger back cavity and taller comb finger according to a fifth embodiment.

FIGS. 14, 15 and 16 show a device that is designed to be used in the actuation mode, such as for a microspeaker. Similar reference numbers are used to the embodiment described above. A silicon capacitive transducer (microspeaker) comprises a diaphragm 32 supported by four hinges 29a, 29b, 29c and 29d. The diaphragm 32 is made of the bulk conductive silicon connected to the fixed anchors by serpentine shaped silicon hinges 29a, 29b, 29c and 29d. The four hinges are connected to the anchor 37a, 37b, 37c and 37d which are sitting on the dielectrical material 11. The actuation element is the vertical combdrive structure and includes movable comb fingers 36 and fixed comb fingers 35. The movable comb fingers 36 are formed on the outside edge of the diaphragm 32. The fixed comb finger structures 35 are built around the diaphragm 32 and fixed on the dielectrical material 11 by anchor 38a, 38b, 38c and 38d. The diaphragm 32, hinges 29a, 29b, 29c and 29d, anchors 37a, 37b, 37c, 37d, 38a, 38b, 38c and 38d, vertical comb fingers 35 and 36 and electrical interconnection structure 39a, 39b and 39c are made of the same layer of electrical conductive silicon 10 which is on the top of dielectrical material 11. The electrical interconnection structure 39a, 39b and 39c electrically connects all four fixed comb finger structures 35 around the diaphragm 32. Anchor 37 and 38 can be used as the electrical connection points for the integrated on-chip IC circuit, or for the bonding pads if a hybrid package is required for the transducer. For sub-mm-size or mm-size diaphragm, sufficient number of movable comb fingers 36 can be formed on its edge to achieve working capacitance of Pico Farads which is equivalent to the capacitance offered by parallel plate structure in the prior arts. When the actuation voltage is apply between the anchor 37 and 38, a high density electrical field will be created between the fixed comb fingers 35 and movable fingers 36. The resulting electrostatic force will actuate the diaphragm 32 to create acoustic pressure wave. The flexible hinges 29a, 29b, 29c and 29d will maintain the piston movement of the diaphragm 32 instead of the parabolic deformation which is common to many prior art devices. The etching cavities 20a, 20b, 20c and 20d on the diaphragm 32 are to reduce the mass the diaphragm for better high frequency response. The transducer has no backplate since its diaphragm 32 is suspended on the cavity 40 of the carrier wafer 12.

By comparing the actuation embodiment described above with the sensing embodiment described previously, certain differences can be noted. In the actuation embodiment, the external peripheral edge is within the interior peripheral edge of the cavity 12, such that the diaphragm 32 only partially covers the cavity 12. In addition, the fixed comb fingers 35 are taller than was the case previously. These differences are intended to improve performance in the actuation mode, as will be described in more detail below.

Manufacture

FIG. 2-FIG. 11 show the major process steps that may be used to manufacture either a sensing or actuation device.

The general steps to manufacture the capacitive transducer include first, applying a first etching mask on a layer that is mounted on a substrate to define the position of one of a movable set of fingers and a fixed set of fingers. The position of the body and the springs may also be defined by the first mask. Next, a second etching mask is applied to define the movable set of fingers, the fixed set of fingers, a body, and springs, the body being connected to the movable set of fingers and the springs, the movable set of fingers being interdigitated with the fixed set of fingers. The second etching mask is then used to etch the layer and the first etching mask. The second etching mask is removed, and the layer is then etched using the first etching mask, such that one of the movable set of fingers and the fixed set of fingers is shorter than the other of the movable set of fingers and the fixed set of fingers. The body, the springs, and the movable set of fingers are then released using etching, such that, upon applying a force to the body, the body moves parallel to the substrate. The variations in this process to obtain the various embodiments will be apparent from the discussion below.

Figure 2:
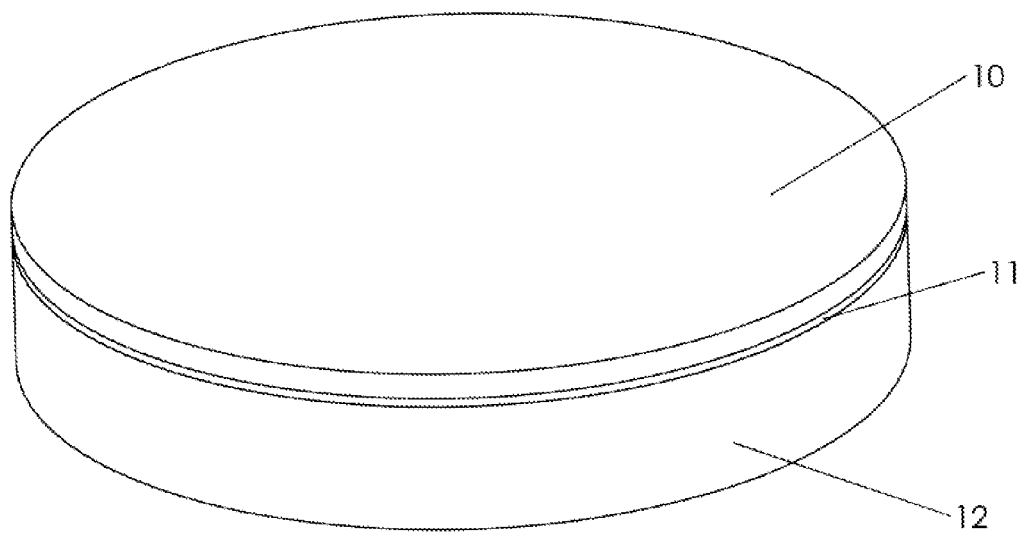
FIG. 2 is a cross sectional view showing the structure of the SOI wafer for the transducer according to a first embodiment.

FIG. 2 shows the wafer for the transducer. The process for making such wafer is not described here. The layer 10 is a layer of conductive material such as preferred single crystalline bulk silicon or low stress polysilicon. The layer 11 is a layer of dielectrical materials such as an oxide or nitride. Carrier wafer 12 material can be regular silicon or glass. The substrate can also be purchased from any SOI (Silicon On Insulator) vendors. Although a variety of materials can be used, SOI type wafer is used for the purpose of explaining the process of a first embodiment.

Figure 3:
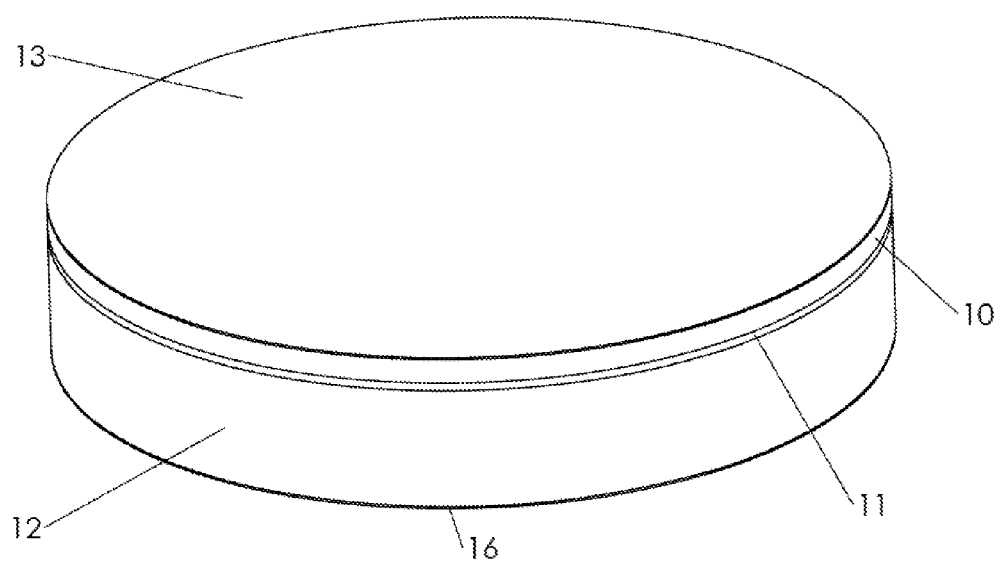
FIG. 3 is a cross sectional view of the SOI wafer after deposition of layer of oxide on its top and bottom sides according to a first embodiment.
Figure 4:
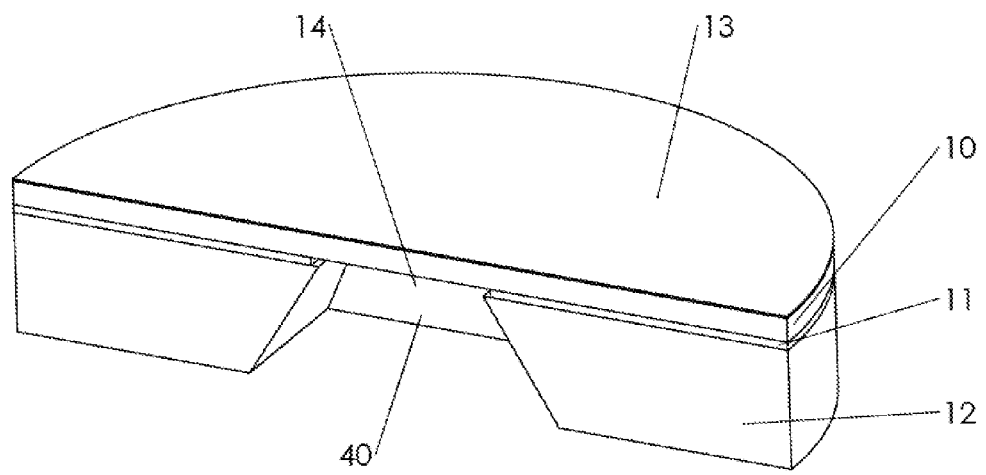
FIG. 4 is a cross sectional view of the SOI wafer after anisotropic silicon etching of backside cavity and oxide etching from its backside.

FIG. 3 shows the SOI wafer after growing a layer of oxide 13 and 16 on its top and bottom sides. The thermal oxidation process can be used for oxide growth. FIG. 4 shows the substrate after being subjected to a silicon anisotropic etch in KOH (Potassium hydroxide) or TMAH (Tetramethylammonium hydroxide) and, subsequent oxide etching in a buffered HF(Hydrofluoric acid) solution with the top side of the SOI wafer protected. The cavity 14 is formed on the oxide layer 11 and a cavity 40 on the carrier silicon wafer 12. The cavity 40 can be also etched using any other anisotropic etching methods such as Silicon Deep Reactive Ion Etching (DRIE).

The critical processing for making the vertical comb driver structure is to guarantee the perfect alignment of movable fingers 36 with the fixed fingers 35. If they are misaligned, the air gaps between one moveable finger with adjacent two fixed fingers or vice visa will not be equal, which will result in the sideway movement of the movable finger 36 due to unequal electrostatic force on its right and left side. This unexpected sideway movement will cause the malfunction of the comb drive structure.

Figure 5:
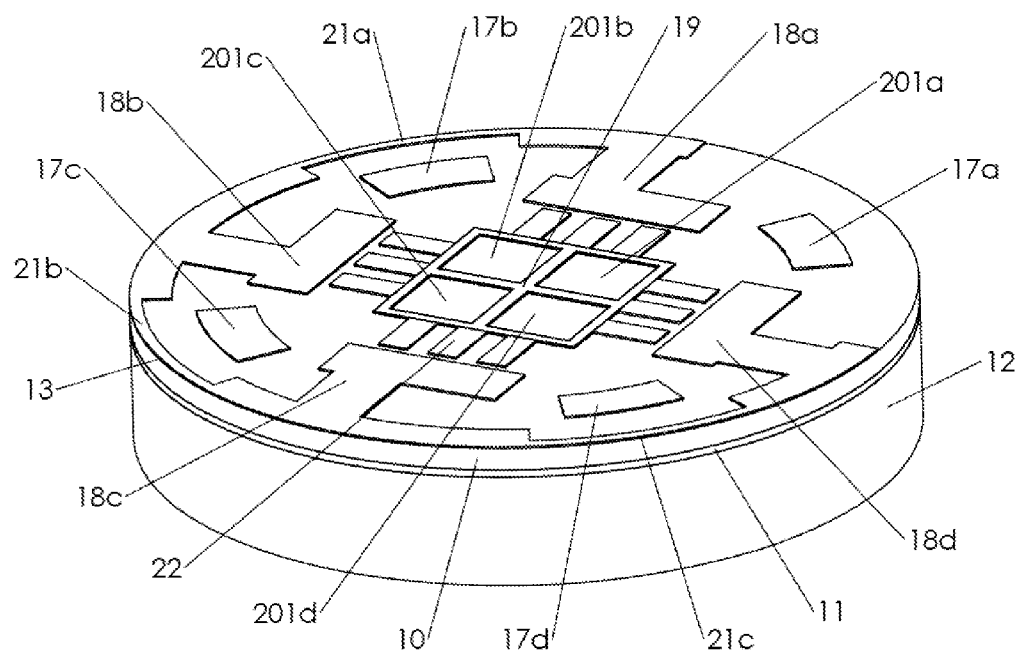
FIG. 5 is a perspective view of the SOI wafer after patterning and etching the oxide on its front side according to a first embodiment.

The manufacturing steps applies the self alignment process to microfabricate the vertical comb drive structure. FIG. 5 shows the patterning of the oxide layer on the top side of a SOI wafer. The oxide patterning is done using regular lithography and oxide etching process such as RIE (Reactive Ion Etch). The oxide 22 on the movable fingers is patterned. Areas 17a, 17b, 17c, 17 d, 18a, 18b, 18c, and 18d are pattered for the anchors 37 and 38. Areas 21a, 21b and 21c are patterned for the electrical interconnection structure 39. Areas 201a, 201b, 201c and 201d are oxide free for formation silicon cavities 20 on the diaphragm 32.

Figure 6A:
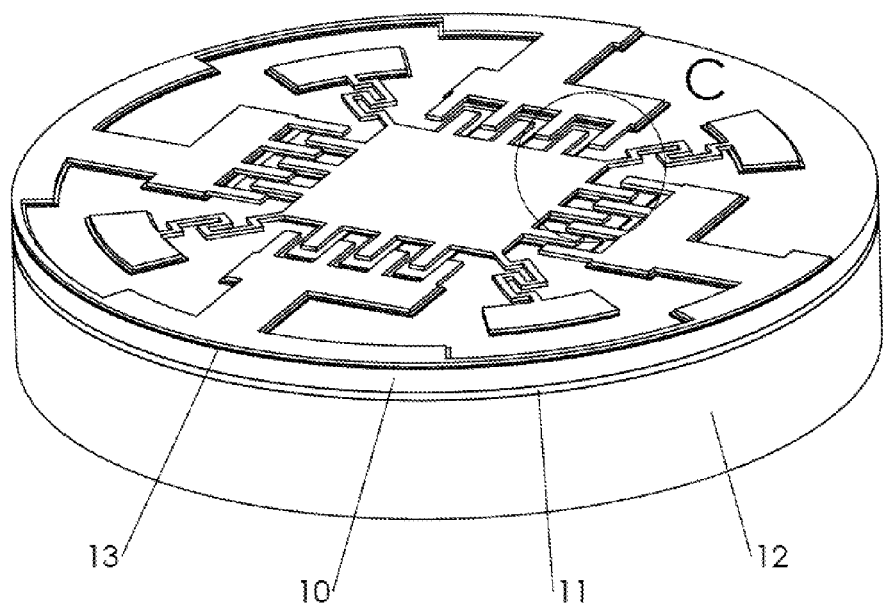
FIG. 6a is a perspective view of the SOI wafer in FIG. 5 after patterning of a layer of photoresist.
Figure 6B:
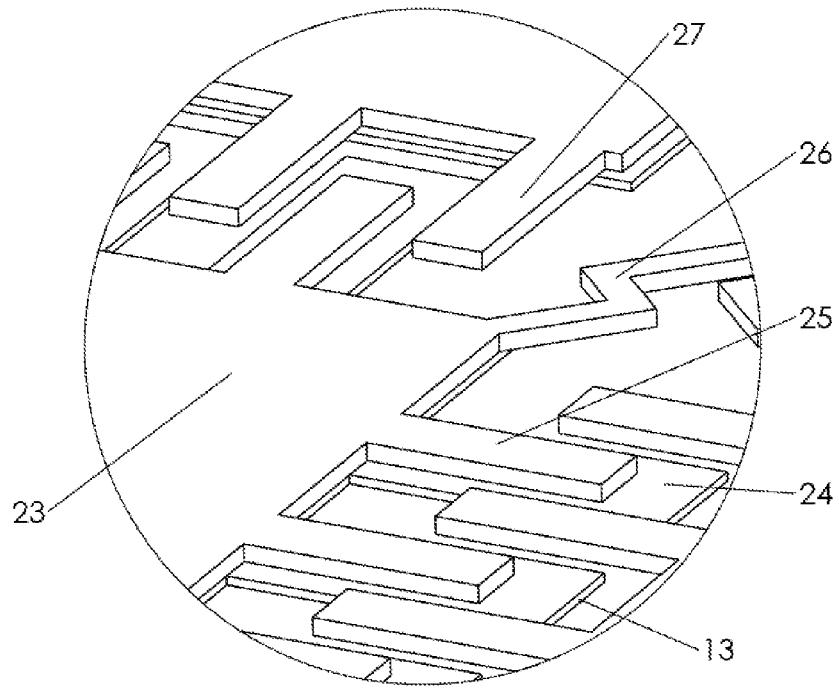
Figure 7A:
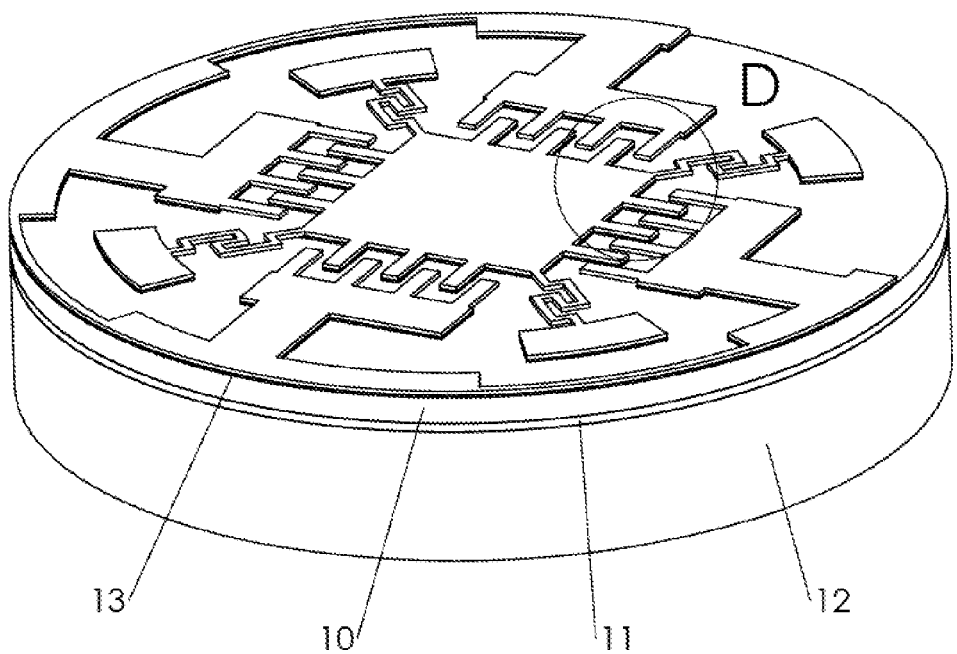
FIG. 7a is a perspective view of the transducer in FIG. 6 after Reactive Ion Etching (RIE) of a layer of oxide.
Figure 7B:
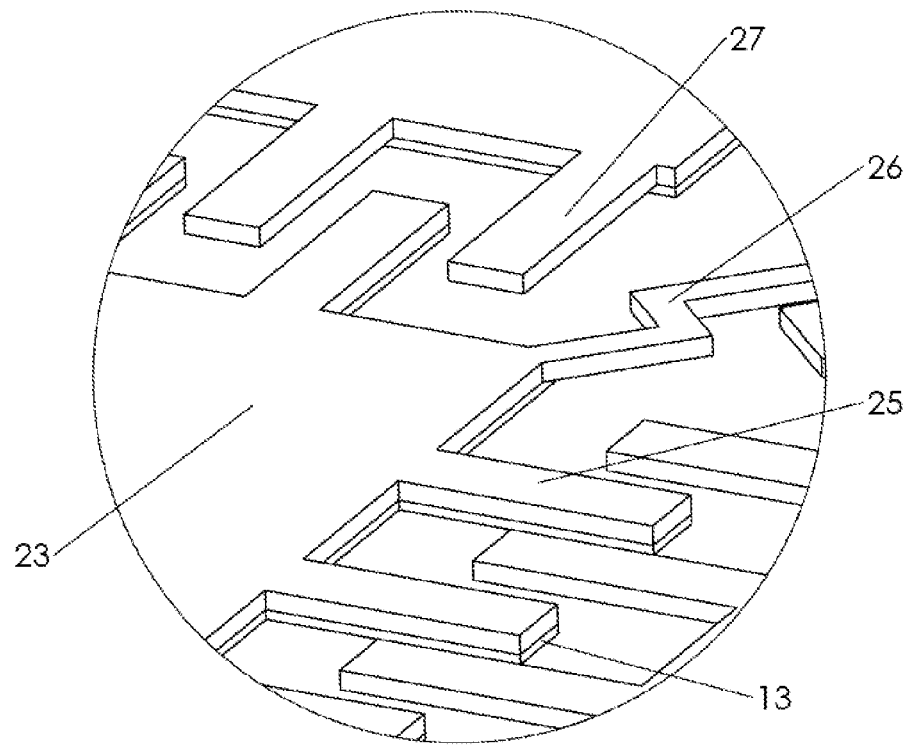

FIG. 6a shows the SOI wafer depicted in FIG. 5 after photoresist patterning. This lithography step defines the shape of movable fingers and hinges, and redefines the oxide pattern depicted in FIG. 5. In order to accommodate the possible larger alignment tolerance during the process, the geometry sizes of oxide patterning in FIG. 5 are larger than the desired device feature sizes. An enlarged perspective view of a portion C of the comb fingers 25 and 27 and hinge 26 depicted in FIG. 6a is shown in FIG. 6b. The final shapes of the movable comb fingers 36, fixed comb fingers 35, diaphragm 32 and hinges 29a, 29b, 29c, and 29d are defied precisely by photoresist 25, 27, 23 and 26 respectively. The extra oxide 24 of oxide layer 13 will be cleared out by a subsequent oxide RIE process. FIG. 7 shows the SOI wafer in FIG. 6 after oxide RIE etch process. An enlarged perspective view of a portion D of the comb fingers 25 and 27 and hinge 26 depicted in FIG. 7a is shown in FIG. 7b.

Figure 8:
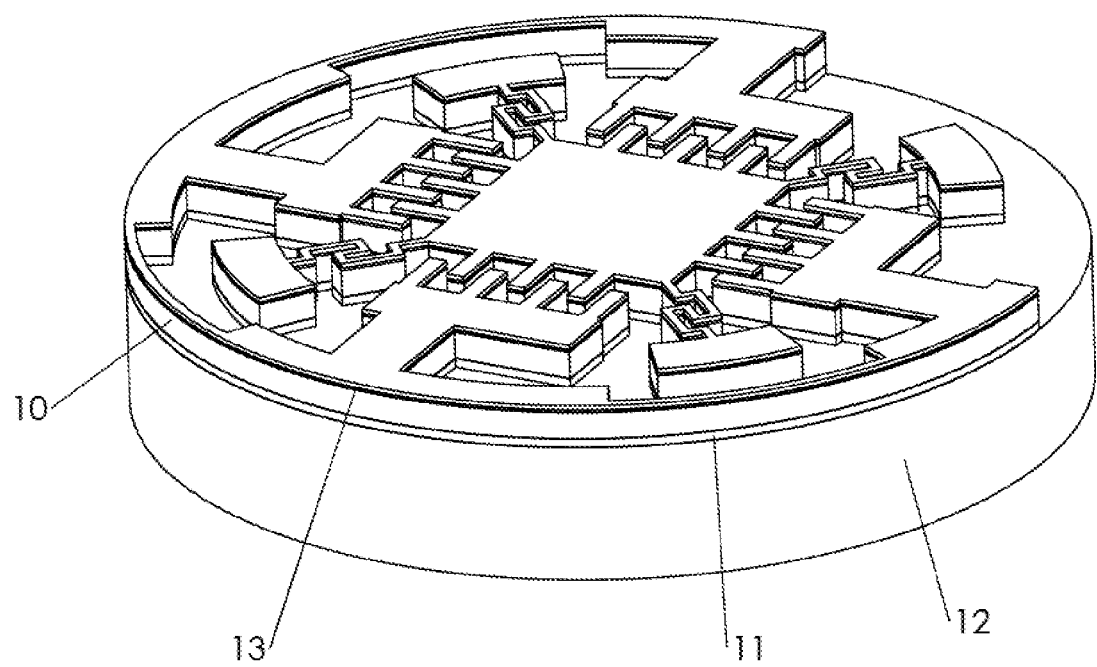
FIG. 8 is a perspective view of the transducer in FIG. 7 after the first Deep Reactive Ion Etching (DRIE) of silicon.

The patterned photoresist layer is used as etching mask material for the first silicon DRIE etching. The oxide layer 11 is used as the etching stop layer for the first silicon DRIE. FIG. 8 shows the substrate after the first silicon DRIE.

Figure 9A:
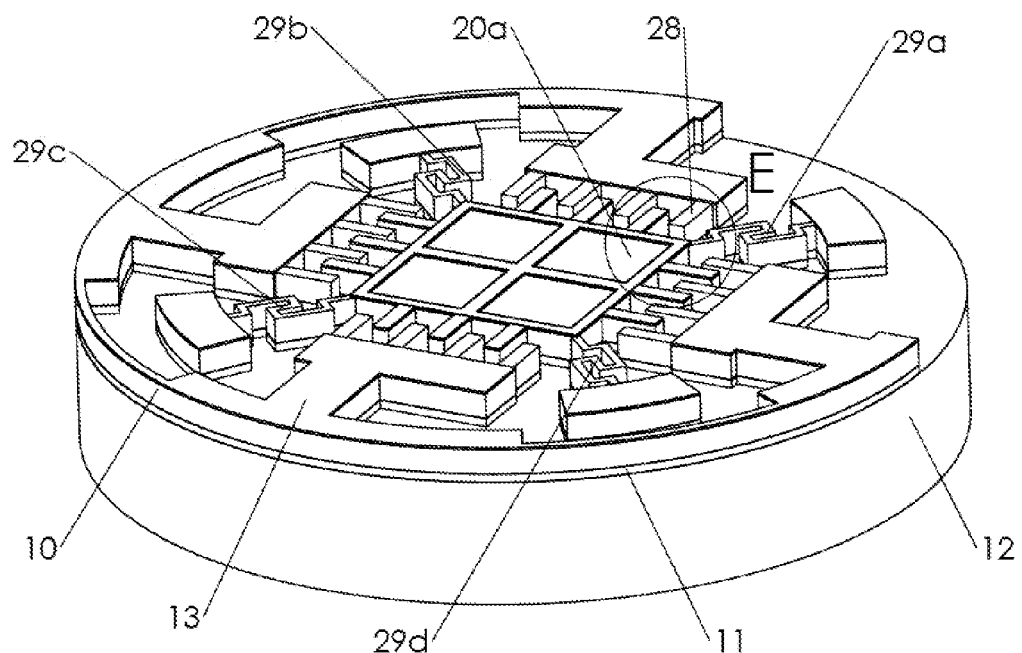
FIG. 9a is a perspective view of the transducer in FIG. 8 after removal of photoresist.
Figure 9B:
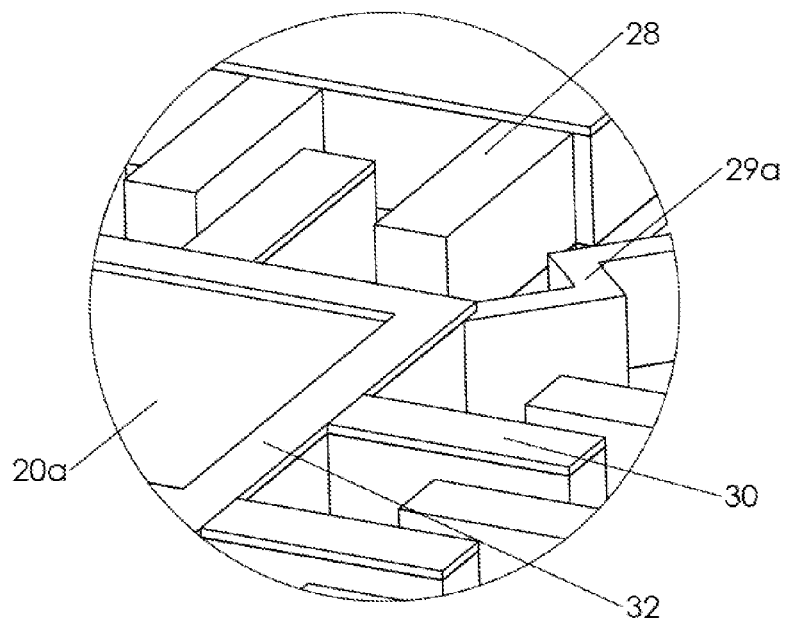
Figure 10A:
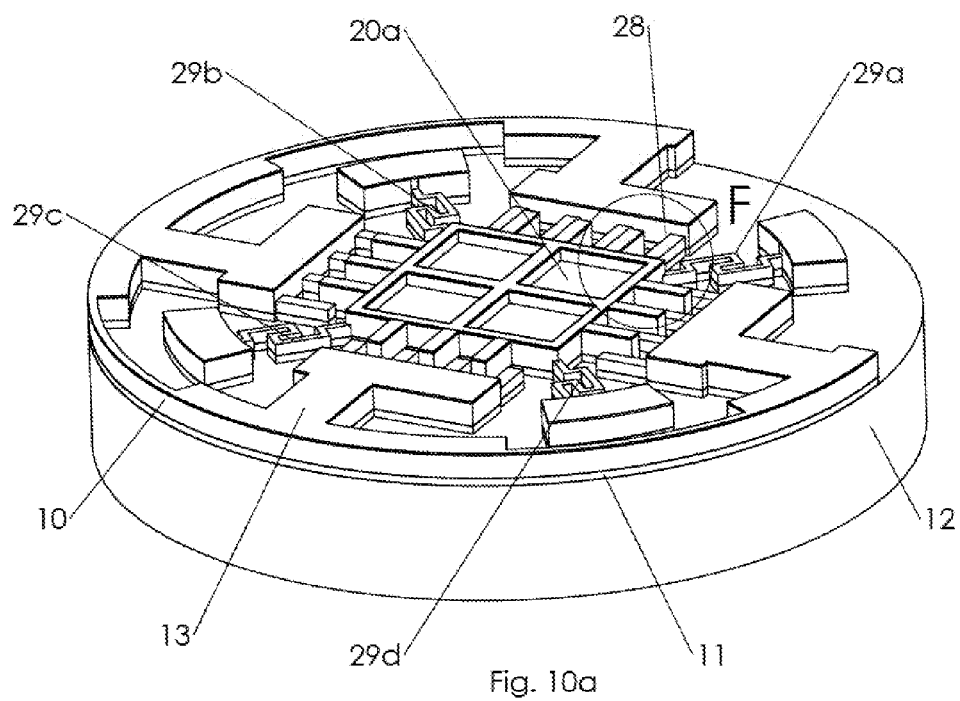
FIG. 10a is a perspective view of the transducer in FIG. 9 after the second Deep Reactive Ion Etching (DRIE) of silicon.
Figure 10B:
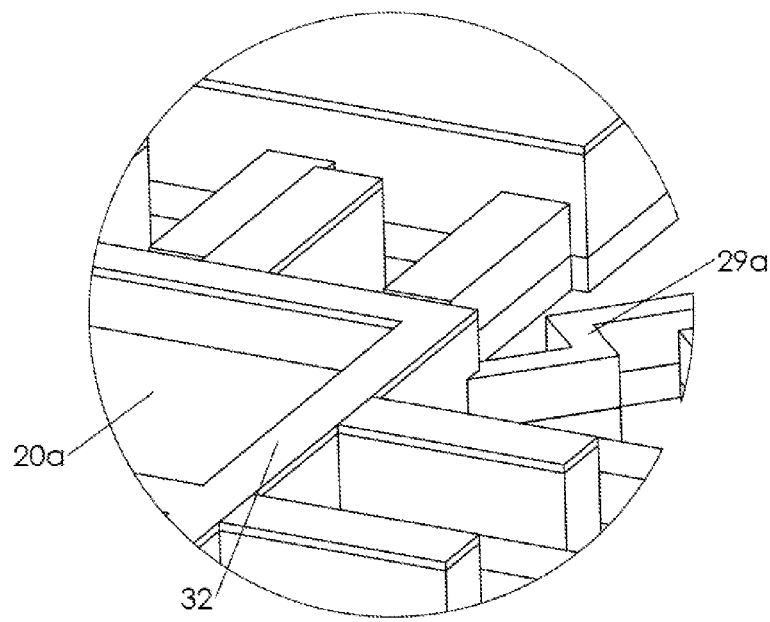

The photoresist is removed after the first silicon DRIE etching. FIG. 9b shows an enlarged perspective view of a portion E of the comb fingers 28 and 30 and hinge 29a depicted in FIG. 9a. The hinge 29a and fixed comb finger 28 have no oxide on their tops while the movable finger 30 and diaphragm 32 have oxide on their tops for the subsequent second silicon DRIE etching. The second silicon DRIE etching forms the lower fixed comb fingers, flexible hinges 29a, 29b, 29c and 29d and cavities 20. FIG. 10b shows an enlarged perspective view of a portion F of the comb fingers 28 and 30 and a hinge 29a depicted in FIG. 10a.

After etched in buffered HF, the diaphragm 32, hinges 29a, 29b, 29c and 29d, and movable comb fingers 36 are released form the oxide layer 11. The finished transducer is shown in FIG. 11 and FIG. 1. The microfabrication processes disclosed here doesn't include the processes to integrate with standard IC COMS process. However, it is very easy to achieve such integration for the people skill in the art. FIG. 12 shows a cross sectional perspective view of the microphone according to a second embodiment, where the comb finger configuration is different. In FIG. 12, the movable fingers 35 and fixed fingers 36 are offset, whereas in FIGS. 1 and 11, the movable fingers 35 are higher than the fixed fingers 36. Either set of fingers may be taller or positioned above the other. While the offset fingers are more difficult to manufacture, they have a larger effective range motion, or in the actuation mode, require less power.

Figure 13:
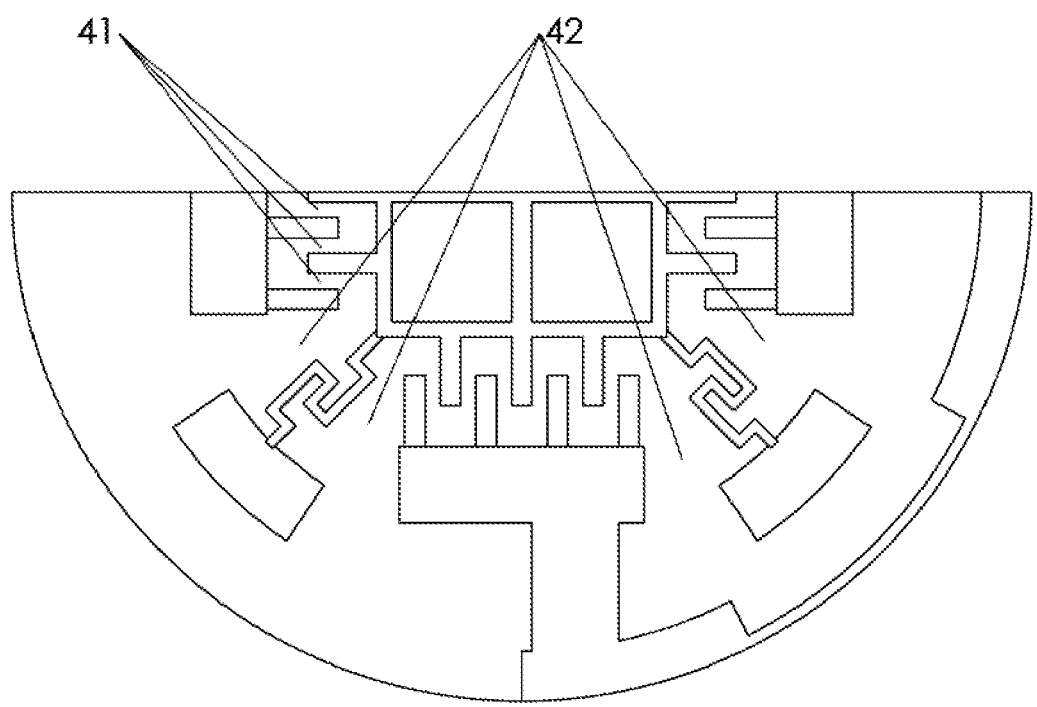
FIG. 13 is the top view of the microphone depicted in FIG. 1 and FIG. 12.

Referring to FIG. 13, an air gap 41 between comb fingers 35 and 36 and an air gap 42 between hinges 29a, 29b, 29c, and 29d and comb fingers 36 of around 2 μm provides sufficient resistance for a low frequency response of the transducer. If 2 μm is achievable for air gaps 41 and 42 with the current microfabrication technology, then the long air flow path 33 shown in between diaphragm 32 and the carrier wafer 12 becomes unnecessary.

If the device is intended to be used as a microspeaker, a larger translation of the diaphragm 32 during actuation is preferable to create a higher sound wave pressure level from the miniature silicon microspeaker. So a thicker silicon layer 10 as shown in FIG. 14 should be used to make the larger height difference between the fixed fingers 35 and movable fingers 36. In doing so, a larger electrostatic force and a correspondingly larger actuated translation movement between the fixed and movable fingers 35 and 36 can be expected. A larger silicon cavity 40 should also be formed in the carrier wafer 12 so that the diaphragm 32 can obtain a larger up and down translational movement without any mechanical obstruction. The miniature microspeaker embodiment is depicted in the FIG. 14.

One of the advantages of silicon microspeaker is that it offers less power consumption due to electrostatic actuation. In addition, for the same hinge design, the driving voltage for the silicon microspeaker can be further lowered by reducing the overlapping region between fixed and movable comb fingers, such that they are offset. The reason for this is that the electrical field in the overlapping region between fixed and movable comb fingers 35 and 36 will prevent the constructive movement of the diaphragm 32. One way to reduce the overlapping region between fixed and movable comb fingers 35 and 36 is to etch away the lower part of the fixed comb fingers 35 during the fabrication of the engineered SOI wafer. For example, the device layer may be pre etched before it is bonded with a carrier silicon wafer. FIGS. 15 and 16 depict embodiments where the lower portion of either fixed comb finger 35 or movable finger 36 is etched away.

Figure 17:
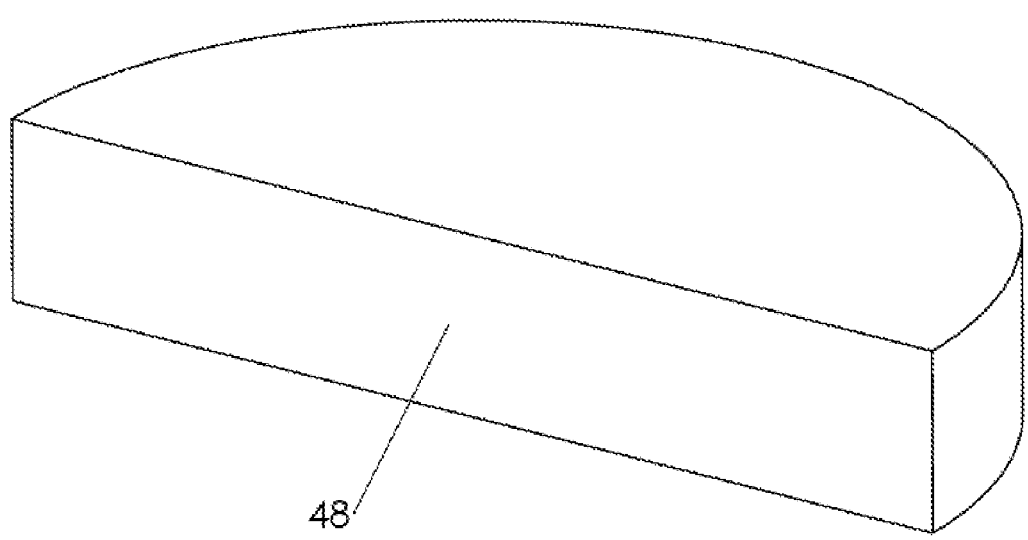
FIG. 17 is a cross sectional perspective view of the N type substrate for the transducer according to a sixth embodiment.
Figure 18:
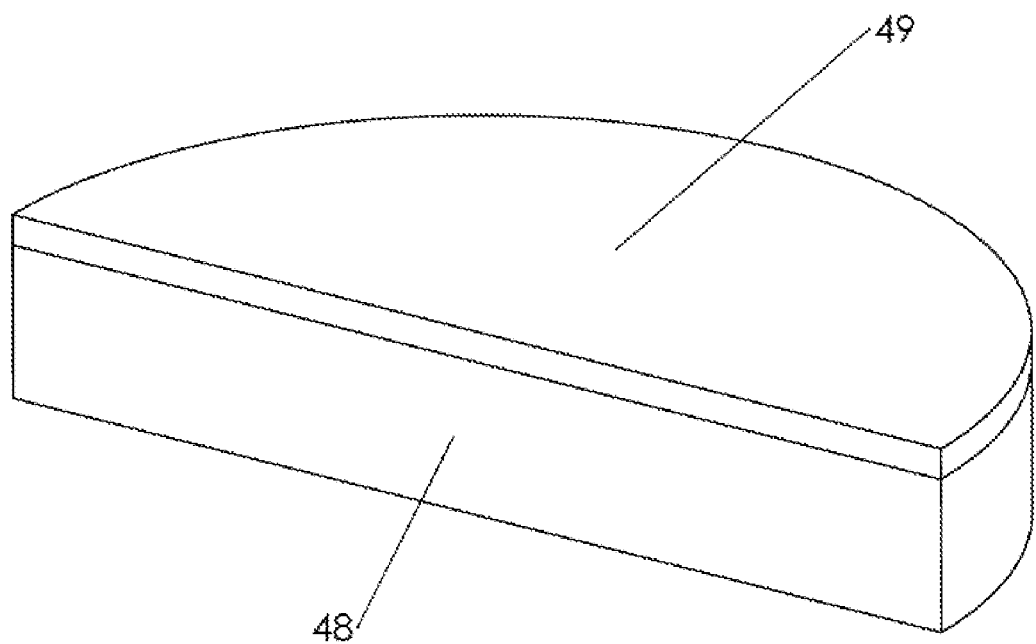
FIG. 18 is a cross sectional perspective view of the N type substrate after P++ implantation/diffusion, or epitaxial growth of layer a silicon with P doping according to a sixth embodiment.
Figure 19:
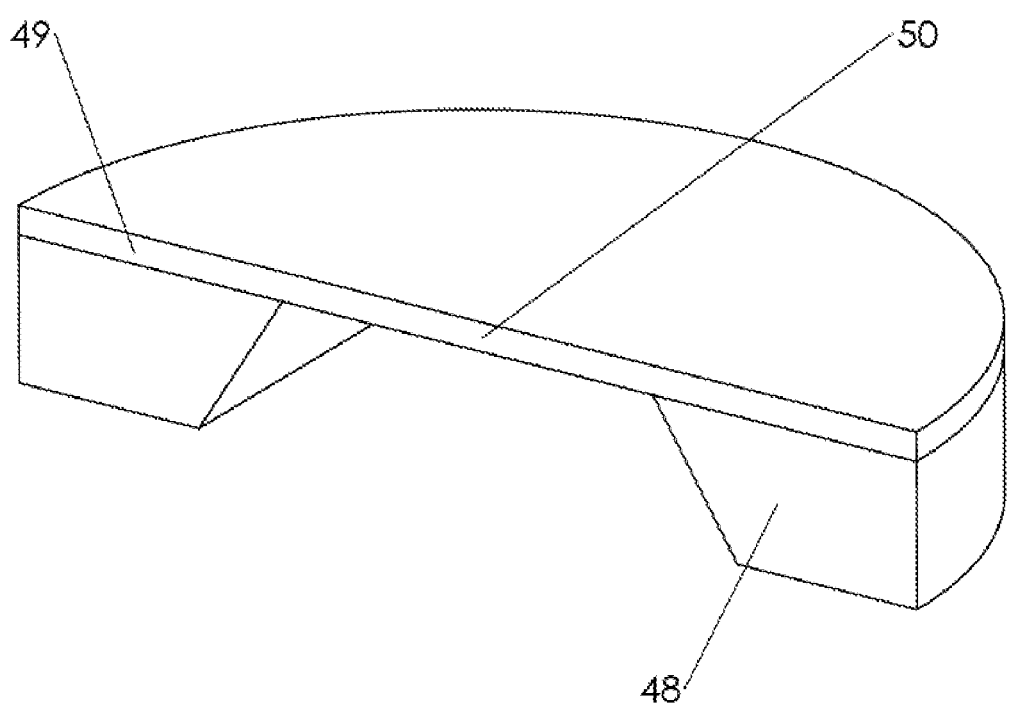
FIG. 19 is a cross sectional perspective view of the substrate depicted in FIG. 18 after anisotropic silicon etching of backside cavity according to a sixth embodiment.
Figure 20:
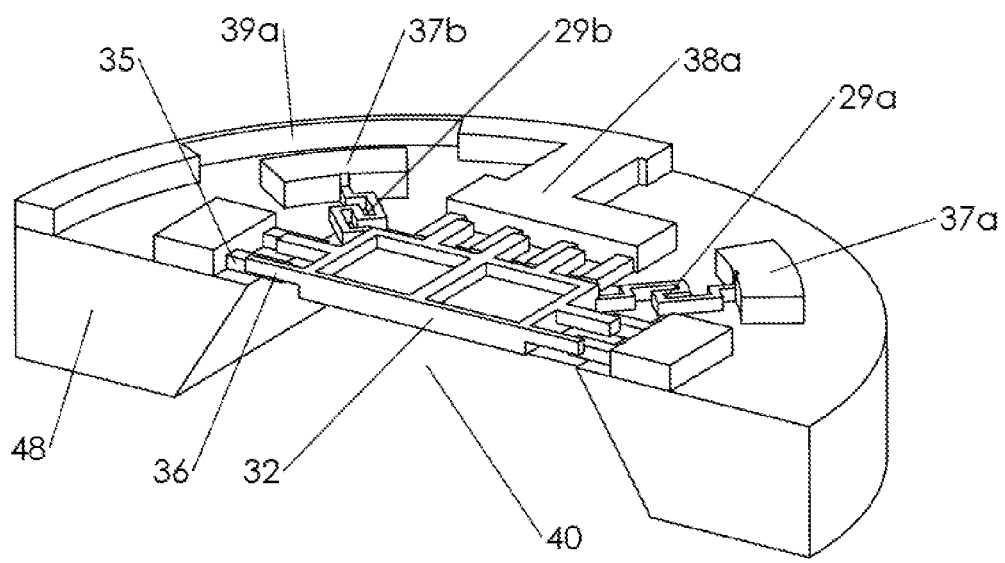
FIG. 20 is a cross sectional perspective view of the transducer in FIG. 19 after process of silicon Deep Reactive Ion Etching (DRIE) with the self-align process disclosed herein.

Another alternative embodiment is shown in FIG. 20, and formed of an N type substrate with P type structures. A regular N type silicon wafer 18 in FIG. 17 is the starting material for the transducer. A layer of P++ silicon 49 is formed on top of N type silicon 48 by either epitaxial growth or doping/diffusion or implantation/diffusion as shown in FIG. 18. P++ silicon 49 is used for building the transducer. Referring to FIG. 19, the P++ silicon 49 is used as silicon etch stop layer to form diaphragm 50 using silicon anisotropic etching in either KOH or TMAH, which will etch the N type substrate 18, but not the P++ silicon 49.

The embodiment shown in FIG. 20 is formed using the self alignment process method disclosed above with reference to FIG. 3-FIG. 11. The fixed comb finger 35 is electrically isolated from movable comb finger 36 and diagram 32 by the PN junction formed between the N type and the P type layers. The transducer made based on this embodiment will reduce the wafer cost and increase the flexibility for integration with IC CMOS process.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

I claim:

1. A method of manufacturing a capacitive transducer comprising the steps of:
    applying a first etching mask on a layer to define the position of one of a movable set of fingers and a fixed set of fingers, the layer being carried by a substrate;
    applying a second etching mask to define the movable set of fingers, the fixed set of fingers, a body, and springs, the body being connected to the movable set of fingers and the springs, the movable set of fingers being interdigitated with the fixed set of fingers;
    etching the layer and the first etching mask using the second etching mask;
    removing the second etching mask;
    etching the layer using the etched first etching mask such that one of the movable set of fingers and the fixed set of fingers is shorter than the other of the movable set of fingers and the fixed set of fingers; and
    releasing the body, the springs, and the movable set of fingers using etching, such that, upon applying a force to the body, the body moves parallel to the substrate.

2. The method of claim 1, wherein etching comprises Deep Reactive Ion Etching (DRIE).

3. The method of claim 1, wherein the layer is a silicon wafer and the silicon wafer is bonded to the substrate using one of fusion bonding, anodic bonding and epoxy bonding.

4. The method of claim 1, wherein the layer is a layer of p-type material and the substrate is of n-type material, and wherein the layer is formed on the substrate by one of doping, implantation, and deposition.

5. The method of claim 1, wherein the position of the body and the springs is defined by the first etching mask.

6. The method of claim 1, further comprising the step of, prior to mounting the layer to the substrate, etching a face of the layer that engages the substrate.

7. The method of claim 1, further comprising the step of depositing a lightweight material on the body.

8. The method of claim 7, further comprising the step of using a polymer as the lightweight material.

\* \* \* \* \*